United States Patent Office 3,847,961
Patented Nov. 12, 1974

3,847,961
FLUOROALIPHATICTHIOMETHYLSILOXANES
Robert J. Koshar, Village of Mahtomedi, Minn., assignor to Minnesota Mining and Manufacturing Company, St. Paul, Minn.
No Drawing. Filed Apr. 2, 1973, Ser. No. 346,992
Int. Cl. C07f 7/08
U.S. Cl. 260—448.2 N                       18 Claims

ABSTRACT OF THE DISCLOSURE

Organosiloxanes containing certain highly fluorinated substituents have been found to be resistant to many organic solvents, heat stable, and flexible at low temperatures. These organosiloxanes are represented by the formula

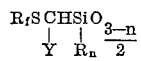

wherein $R_f$ is a highly fluorinated monovalent fluoroaliphatic radical having 1 to 18 carbon atoms.

---

Organosiloxanes have been conventionally used in many different applied fields. They have found acceptance as release agents, protective coatings, high temperature lubricants, gaskets, electrical insulation, etc. The good mechanical properti es of organosiloxanes, especially high molecular weight polymers, make them suitable for such a variety of uses. However, organosiloxanes, e.g., having methyl or phenyl groups attached to the silicon atoms, have been found, in general, to offer little resistance to many hydrocarbon fluids which are solvents for the siloxanes or cause swelling of the cured polymer. Where the organosiloxanes are elastomers and must resist structural forces, this is an especially undesirable characteristic. High molecular weight, linear organosiloxanes such as polydimethylsiloxanes having molecular weights of 500,000 or higher are known to be highly soluble in aromatic solvents such as benzene and toluene.

Attempts have been made to improve the solvent resistance of organosiloxanes by providing siloxanes having fluorine atoms in some of the substituent groups on the silicon atom. One such attempt is shown in U.S. Pat. No. 3,122,521. Here, perfluoroalkyl groups are introduced into the organosiloxane as a substituent to the backbone of the polymer chain in the following manner:

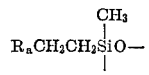

wherein $R_a$ is a perfluoroalkyl group such as $CF_3$. These siloxanes are disclosed as exhibiting increased solvent resistance which enables them to be used in some hydrocarbon solvent environments. One disadvantage of these polymers is that they can undergo severe chain scission and reversion to low molecular weight cyclic products at high temperatures (cf. O. R. Pierce and Y. K. Kim, *Rubber Chemistry and Technology*, 44 (5), 1350 (1971)). Although these siloxanes are an improvement in some aspects over many conventional organosiloxanes, further improved solvent resistance to certain solvents, heat stability at elevated temperatures, and low temperature flexibility are desirable.

Lower molecular weight organosiloxanes having desirable properties for use as solvents, lubricants, release agents, surface active agents, sealants, etc., are also needed.

Furthermore, fluorosilicon compounds having for example $CF_3CH_2$— or $CF_3$— groups attached directly to the silicon atom exhibit hydrolytic instability and easily undergo thermal decomposition.

In one facet of the present invention it has been found that organosiloxanes having fluoroaliphaticthiomethyl groups bonded to the silicon atom in the siloxane unit exhibit desirable properties such as hydrocarbon solvent resistance, heat stability, and flexibility at low temperatures.

It is another facet of this invention that low molecular weight, intermediate molecular weight, and high molecular weight organosiloxanes containing a fluoroaliphaticthiomethyl group bound to the chain exhibit desirable properties.

It is yet another facet of this invention that fluoroaliphaticthiomethyl groups may be introduced into organosiloxane compounds by direct substitution onto cyclic, linear or branched organosiloxanes with fluoroaliphaticsulfenyl chlorides.

In the practice of this invention it has been found that organosiloxanes exhibit desirable properties when they contain one or more structural units of the formula:

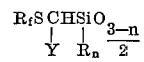

wherein $R_f$ is a highly fluorinated monovalent fluoroaliphatic radical having 1 to 18 carbon atoms, R is an organic group selected from methyl, ethyl and phenyl groups (which may have inert substituents), Y is selected from hydrogen, chlorine, methyl, chloromethyl, phenyl, $R_fS$ and $R_fCH_2$, and $n$ is 0–2. The group $R_f$ in the radicals $R_fS$ and $R_fCH_2$ are also highly fluorinated monovalent fluoroaliphatic radicals as defined above.

In the practice of this invention, the term highly fluorinated monovalent fluoroaliphatic radical encompasses fluorinated, saturated, monovalent, nonaromatic, aliphatic radicals having 1 to 18 carbon atoms. The skeletal chain of the radical may be straight, branched or, if sufficiently large, cyclic (cycloaliphatic) and may be interrupted by divalent oxygen atoms or trivalent nitrogen atoms bonded only to carbon atoms. Preferably the chain of the fluorinated aliphatic radical does not contain more than one hetero atom, i.e., nitrogen or oxygen, for every two carbon atoms in the skeletal chain. A fully fluorinated group is preferred, but hydrogen or chlorine atoms may be present as substituents in the fluorinated aliphatic radical provided that not more than one atom of either is present in the radical for each carbon atom. Preferably, the fluoroaliphatic radical is a saturated perfluoroalkyl radical having a skeletal chain that is straight or branched and has the structural formula $$C_xF_{2x+1}$$

wherein $x$ has a value from 1 to 18.

The fluoroaliphaticthiomethylsiloxanes of the present invention are conveniently prepared by a free radical substitution reaction of a fluoroaliphatic sulfenyl chloride with a cyclic, linear or branched methyl siloxane having one or more structural units of the general formula

wherein Y, R, and $n$ are as defined above.
Examples of such units are

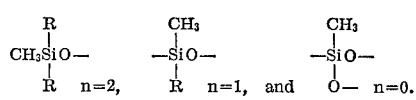

These methyl siloxane units are connected by the silicon-oxygen linkages. The preferred linkages are

The general reaction for free radical substitution is illustrated simply by the following reaction formula in which the starting methyl siloxane contains repeating units of $CH_3Si(R)O$ ($n=1$) and $p+q$ represent the number of siloxane units in the polysiloxane:

Reaction I

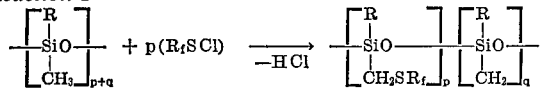

wherein R and $R_f$ are as defined above. The preferred starting methyl siloxanes are the polydimethylsiloxanes where R is methyl.

The inert substituents which may be used on group R are those substituents which are less reactive to the sulfenyl chloride than are the active methyl substituents attached to the silicon atom groups in the siloxane unit. This is required because substituent groups more active than this will prevent the formation of the proper units within the polymer chain. Examples of such inertly substituted R groups are $CH_2Cl$, $CH_2Br$, $CCl_3$, $CH_2CN$, p-fluorophenyl, and p-trifluoromethylphenyl. Any substituent which is less reactive, however, is tolerable in the practice of this invention.

The starting methyl siloxanes can be lower molecular weight linear compounds such as, for example, hexamethyldisiloxane, cyclic compounds such as, for example, octamethylcyclotetrasiloxane, or higher molecular weight polymeric materials such as, for example, polydimethylsiloxane fluids having viscosities of about 0.5 to one million centistokes or polydimethylsiloxane gums having molecular weights of 300,000 to 800,000 or even higher. The starting methylsiloxanes may be homopolymers or copolymers having two or more different siloxane units such as a polydimethylsiloxane having also methylphenylsiloxane units,

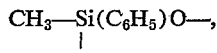

in the siloxane chain. These preferred polymeric starting materials have terminal groups such as OH, $-OSi(CH_3)_3$ or chlorine attached to silicon atoms.

The above reaction is carried out by photochemical methods such as the use of high or low pressure quartz mercury vapor lamps. An alternative method is the initiation of the reaction by decomposition of free radical catalysts such as acetyl peroxide, benzoyl peroxide and the like or azo catalysts such as azobisisobutyronitrile. The temperature range for free radical generation is about $-30$ to $100°$ C. depending on the type of initiation used and the temperature at which generation of free radicals from the catalyst occurs. Photochemical reactions are conveniently carried out at room temperature.

The general reaction can be carried out in reaction vessels constructed of metal such as stainless steel, quartz or Pyrex under atmospheric, subatmospheric or superatmospheric pressure depending on the method and siloxane used. This reaction with polymeric methylsiloxanes is best carried out under atmospheric or subatmospheric pressure under essentially anhydrous conditions to avoid high concentrations of HCl which is generated in the reaction and can cause silicon-oxygen cleavage.

Although the reactions can be carried out without solvent, solvents are preferred especially with polymeric methylsiloxanes. Suitable solvents are those which are generally used for known chlorination reactions and do not react with the sulfenyl chloride. Suitable solvents include chlorinated solvents, such as methylene chloride, chloroform, carbon tetrachloride and 1,1,2-trichlorotrifluoroethane; aromatic solvents such as benzene, chlorobenzene and benzotrifluoride; and inert nitriles such as acetonitrile. In the case of reactions with liquid methylsiloxanes an excess of that liquid can function as the solvent. Polymers can be treated in solution or in the form of film or shaped articles.

The ratio of reactants can vary considerably depending on the number of methylsiloxane units desired to be substituted. The mole ratio of sulfenyl chloride to the methylsiloxane unit can be 0.1:1 or lower to about 10:1 or even higher. Usually a ratio of between 0.5:1 and 3:1 is used to afford polymers where Y is predominantly hydrogen. Use of varying amounts of sulfenyl chloride can thus afford products where in Reaction I, $q$ is extremely low, i.e., a high degree of substitution of units, or $q$ is very high, i.e., a low degree of substitution. Very high mole ratios, e.g., greater than 3:1, usually lead to a higher degree of substitution such as shown in Reaction II, thus providing siloxane units where Y is chlorine and $R_fS-$.

Reaction II

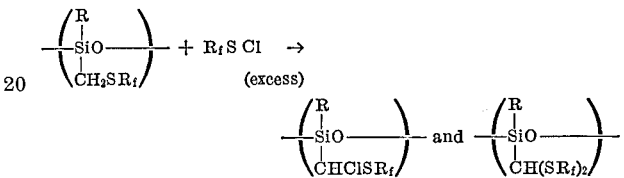

Examples of methylsiloxanes which can be reacted with the sulfenyl chloride are low molecular weight linear siloxanes such as hexamethyldisiloxane, tetradecamethylhexasiloxane, tetracosamethylhendecasiloxane, 1,1,3,3-tetramethyl-1,3-diphenyldisiloxane, 1,1,3,3 - tetramethyl-1,3-diethyldisiloxane, tetramethyl-1,3-dichlorodisiloxane, octamethyl-1,7-dichlorotetrasiloxane, tetramethyl-1,3-hydroxydisiloxane, pentamethyl - 1 - chloromethyldisiloxane, pentamethyl - 1 - bromomethyldisiloxane, tetramethyl - 1,3-p-fluorophenyldisiloxane, and pentamethyl - 1 - cyanomethyldisiloxane; cyclic siloxanes, such as hexamethylcyclotrisiloxane, octamethylcyclotetrasiloxane, tetradecamethylcycloheptasiloxane, 2,4,6,8-tetramethyl - 2,4,6,8-tetraphenylcyclotetrasiloxane, octamethylbicyclopentasiloxane, bis (heptamethylcyclotetrasiloxanyl)methane; polydimethylsiloxane fluids having viscosities of from 0.65 to 2.5 million centistokes such as DC-200 fluid available from Dow Corning Corporation; low or high shrinkage polydimethylsiloxane gums having molecular weights of about 200,000 to 800,000 or higher such as SE-30 and SE-76 available from General Electric Company, DC-400 available from Dow Corning Corporation and W-980 available from Union Carbide Corporation or gums containing methylphenylsiloxane units such as SE-52 (General Electric Company), and W-970 and Y-3747 (both from Union Carbide Corporation).

Another method for providing siloxanes of the invention is by hydrolysis, cohydrolysis and/or condensation reactions of fluoroaliphaticthiomethylsilanes of the formula:

where $R_f$, R, Y, and $n$ are defined above, and X can be hydroxy or any hydrolyzable group which can afford the hydroxy group on hydrolysis. These compounds and their preparation are disclosed in copending U.S. Application Ser. No. 346,993, filed concurrently with this application. Condensation of the silanol (X=OH) can then be effected by known methods to yield the higher molecular weight siloxane. Examples of hydrolyzable groups are halogen such as chlorine, fluorine, bromine; hydrocarbonoxy groups such as methoxy, ethoxy, butoxy, cyclohexyloxy, phenoxy; acyloxy groups such as acetoxy, benzoyloxy, propionyloxy; amino groups such as amino, dimethylamino; sulfide groups such as ethylthio and butylthio and sulfonate groups such as $C_6H_5SO_3-$. The preferred silanes useful for formation of polymeric siloxanes are those wherein $n$ is 0 and 1. Silanes where $n$ is 2 are useful in cohydrolysis for a control of the degree of polymerization and act as chain terminators. The preferred Y group is hydrogen.

The silanes where X is halogen, especially the chlorosilanes, are particularly useful for providing other hydrolyzable X groups such as those described above and in the copending U.S. application referred to above by well-known reactions of the halogen attached to the silicon atom with alcohols, amines, carboxylic acid anhydrides and mercaptans under neutral or basic conditions such as use of organic tertiary amines. The methods used are similar to those reported for reactions of known organohalosilanes. For example, see W. Noll, *Chemistry and Technology of Silicones*, 1968, pp. 78 and 81.

The halosilanes useful in preparing the siloxanes of the invention are prepared by the free radical substitution reaction of fluoroaliphaticsulfenyl chlorides with methylhalosilanes as exemplified by the preparation of the chlorosilanes shown in Reaction III, where $R_f$, Y and $n$ are defined above.

Reaction III

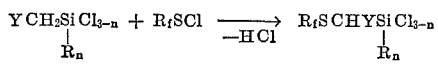

The above reaction is carried out under conditions described above (Reaction I) for the direct synthesis of the siloxanes. Since the halogen atom attached to the silicon atom is very reactive and easily hydrolyzed, inert solvents and anhydrous conditions are employed.

Examples of methylhalosilanes which can be reacted with the sulfenyl chlorides are: methyltrichlorosilane, dimethyldichlorosilane, trimethylchlorosilane, diphenylmethylchlorosilane, phenylmethyldichlorosilane, phenyldimethylchlorosilane, chloromethyldimethylchlorosilane, trichloromethyldimethylchlorosilane, bromomethyldimethylchlorosilane, cyanomethyldimethylchlorosilane, triethylchlorosilane, 3,3,3-trifluoropropylmethyldichlorosilane, diethyldichlorosilane, benzyltrichlorosilane, 4-chlorophenylmethyldichlorosilane, trimethylfluorosilane, trimethylbromosilane, dimethyldifluorosilane and dimethyldibromosilane.

The siloxanes of this invention can also be prepared as copolymers by cohydrolysis of the above fluoroaliphaticthiomethylsilanes having OH or hydrolyzable X groups along with known silicon compounds of the formula $Z_mSiX_{4-m}$ in which X is defined above, $m$ is 0 to 3 and Z can vary widely and can be hydrogen, hydroxy, or any monovalent hydrocarbon radical such as: alkyl radicals, for example, methyl, butyl, t-butyl, octadecyl, cycloaliphatic radicals for example cyclohexyl and cyclopentyl; aryl radicals for example phenyl, tolyl, xylyl and naphthyl; aralkyl radicals for example benzyl and gamma-phenylbutyl; alkenyl radicals for example, vinyl, allyl, hexenyl, butadienyl, α-chlorovinyl or other unsaturated radicals such as butynyl. Z can also be a halohydrocarbon radical such as: chloromethyl, bromomethyl, 2-chloroethyl, bromooctadecyl, chloro cyclohexyl, fluorophenyl, p-trifluoromethylphenyl, 3,3,3-trifluoropropyl. Z can also be a cyanohydrocarbon radical such as cyanomethyl, cyanoethyl or cyanopropyl or a carboxy containing radical such as 2-carboxyethyl or 4-carboxybutyl. Z can also be a divalent hydrocarbon radical such as methylene, tetramethylene, phenylene, naphthylene, cyclohexylene, cyclopentylene and the like, which have two $SiX_{4-m}$ groups attached to Z.

As disclosed above, the $R_f$ group is a monovalent saturated fluoroaliphatic radical which contains predominantly flourine atoms bonded to carbon. The radical can contain hydrogen or chlorine atoms but usually not more than one for each carbon atom. The preferred radical is the perfluoroalkyl radical. The radical may be an open acyclic straight chain or branched-chain structure, or it may be a cyclic group of sufficient size to insure stability such as perfluorocyclohexyl, or it may consist of a hybrid combination such as perfluoro(2-cyclohexylethyl). The radical may include an oxygen atom linking two carbon atoms, e.g., —$CF_2OCF_2$—, or a nitrogen atom linking together three carbon atoms, e.g., $(R_fCF_2)_2NCF_2$—. Examples of the fluoroaliphatic radicals are perfluoromethyl, perfluoroheptyl, perfluorododecyl, perfluoroisopropyl, perfluoro(2 - ethoxyethyl), perfluoro(cyclohexyl), perfluoro(2 - cyclohexylethyl), chlorodifluoromethyl, 2,3-dichloroperfluoropropyl, omega-hydroperfluoroethyl and difluoromethyl.

The starting sulfenyl chloride can be prepared by known methods such as described by E. Kober, J. Am. Chem. Soc. *81* 4810 (1959) and M. Hauptschein, U.S. Pat. 3,256,328. A preferred class of sulfenyl chlorides have a —$CF_2$— group attached to the sulfur atom.

The composition of the fluoroaliphaticthiomethylsiloxane polymers can vary widely, but to be a part of the present invention, such polymers must contain at least one unit of the general formula,

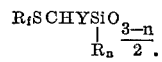

Of particular importance are the preferred polymers predominating in repeating units of

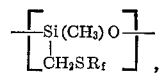

obtained directly by Reaction I or by hydrolysis of the corresponding $R_fSCH_2$— containing silanes. The siloxanes of this invention range from low viscosity fluids useful as lubricants, surface-active agents, solvents, surface treating agents, and release agents to gums which are suitable for milling with fillers and catalysts and which can be crosslinked to provide molded rubbery articles having insolubility and low swell in hydrocarbon based solvents and oils, and which have flexibility at low temperatures. The siloxane polymers can be essentially homopolymers or copolymers having varying amounts of $R_fSCHY$— pendant groups attached to silicon atoms. The polymers can for example contain a combination of siloxane units of the formula

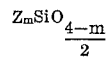

where Z and $m$ are defined above and the units

prepared by Reaction I or by cohydrolysis of one or more $Z_mSiX_{4-m}$ with

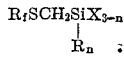

Chain extension or crosslinking of the siloxanes of the invention can be carried out by known methods such as described by Walter Noll in *Chemistry and Technology of Silicones*, 1968, pp. 386–430. For example the siloxane gums can be milled with suitable reinforcing filler, catalyst and other compatible additives and then heat vulcanized under pressure to form a molded article. Catalysts include organic peroxides such as dibenzoyl peroxide, bis(2,4-dichlorobenzoyl peroxide, di-tertiarybutyl peroxide and the like, metal oxides such as zinc oxide and magnesium oxide and organic amines such as 1,1,3,3-tetramethylguanidine, triethylamine and 1,4 - diazabicyclo-[2.2.2]octane. Generally, when peroxides are used, small amounts of siloxane containing vinyl groups attached to silicon atoms are advantageously used to provide a more rapid cure to a useful rubber.

The siloxanes prepared directly by Reaction I usually contain small amounts of siloxane units containing chloromethyl, or $R_fSCHCl$— groups attached to silicon atoms which can serve as crosslinking sites to produce useful rubbers.

The following examples provide a further illustration of the practice of the present invention. Unless otherwise specified temperatures are given in degrees centigrade and pressures are millimeters of mercury.

EXAMPLE 1

A solution of 1.8 g. of octamethylcyclotetrasiloxane and 15 ml. of methylene chloride was placed in a dry quartz flask fitted with a stirrer, gas inlet tube and a −78° cooled condenser connected to a −78° cooled trap. Perfluoromethylsulfenyl chloride (8.0 g., 0.06 mole) was charged into the flask by means of the gas inlet tube and the resultant yellow solution photolyzed at ambient temperature for five hours using an externally located 140 watt Hanovia ultraviolet lamp (type 30620). The colorless solution was distilled to yield 1.2 g. of a poly(perfluoromethylthiomethylsiloxane) oil, having the siloxane unit

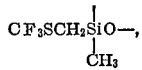

b.p. 82–88° at 0.04 mm., and 3.5 g. of a poly(perfluoromethylthiomethylsiloxane) oil which did not distill or decompose when heated up to 120° at 0.04 mm. The latter product contained 32.2% fluorine, 5.7% chlorine, and 19.0% carbon by analysis and had a molecular weight ($\overline{M}n$ in chloroform) of 870. The presence of $CF_3SCH_2$— groups attached to silicon atoms was confirmed by infrared and nuclear magnetic resonance analysis. Also present in minor amounts were $ClCH_2$—, $CF_3SCHCl$—, and $(CF_3S)_2CH$— groups attached to silicon atoms.

EXAMPLE 2

Using procedures described in Example 1, a solution of 15 g. (0.12 mole) of dichlorodimethylsilane, 16 g. (0.12 mole) of perfluoromethylsulfenyl chloride and 35 ml. of methylene chloride was photolyzed for four hours. Distillation gave 3.8 g. of methyl (perfluoromethylthiomethyl)dichlorosilane, $CF_3SCH_2Si(CH_3)Cl_2$, b.p. 94° C. at 200 mm.

EXAMPLE 3

Methyl(perfluoromethylthiomethyl)dichlorosilane (2.3 g.) was slowly added to 10 ml. of water with rapid stirring. The mixture was stirred for 1.5 hrs. and then extracted with methylene chloride. The dry extract was distilled to remove solvent and the residue heated at 75° C. *in vacuo* to obtain 1.2 g. of silanol oil consisting of

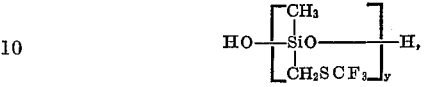

having a molecular weight of about 560 ($\overline{M}n$ in chloroform) and $y$ having an average value of about 3.

EXAMPLE 4

Using procedures described in Example 1, 5.4 g. (0.05 mole) of trimethylchlorosilane, 6.8 g. (0.05 mole) of perfluoromethylsulfenyl chloride and 30 ml. of methylene chloride was photolyzed to yield 3.2 g. of dimethyl(perfluoromethylthiomethyl)chlorosilane, $$CF_3SCH_2Si(CH_3)_2Cl,$$

b.p., 85–88° C. at 150 mm. Cohydrolysis of this silane with the silane described in Example 2 following procedures of Example 3 gives a copolymer having the units,

EXAMPLE 5

Using procedures described in Example 3, a mixture of 2.3 g. of methyl(perfluoromethylthiomethyl)dichlorosilane and 1.3 g. of dimethyldichlorosilane was allowed to react with water giving a siloxane fluid having the siloxane units,

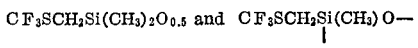

in approximately a 1:1 mole ratio. Other siloxanes produced by hydrolysis or cohydrolysis are exemplified in the following table where mol percents of the starting silane composition are given. The alkoxy silanes are hydrolyzed with 10% aqueous HCl.

| Example | Silane | Siloxane produced |
|---|---|---|
| 5a | $CF_3SCH_2Si(C_6H_5)Cl_2$ | $CF_3SCH_2Si(C_6H_5)O$— |
| 5b | $C_4F_9SCH_2Si(CH_3)Cl_2$ | $C_4F_9SCH_2Si(CH_3)O$— |
| 5c | $CF_3SCH(CH_2CF_3)Si(CH_3)Cl_2$ | $CF_3SCH(CH_2CF_3)Si(CH_3)O$— |
| 5d | $CF_3SCH_2Si(CH_3)Cl_2$ (50%) plus $CF_3SCH(CH_3)Si(C_2H_5)_2Cl$ (50%) | Copolymer containing: $CF_3SCH_2Si(CH_3)O$— and $CF_3SCH(CH_3)Si(C_2H_5)_2O_{0.5}$ units |
| 5e | $CF_3SCH_2SiCl_3$ | $CF_3SCH_2SiO_{1.5}$ |
| 5f | $CF_3SCH_2SiCl_3$ (20%) plus $CF_3SCH_2Si(CH_3)Cl_2$ (70%) plus $CH_2=CHSiCl_2$ (10%) $CH_3$ | Copolymer containing: $CF_3SCH_2SiO_{1.5}$, $CF_3SCH_2Si(CH_3)O$— and $CH_2=CHSiO$— units $CH_3$ |
| 5g | $CF_3SCH_2Si(CH_3)(OCH_3)_2$ (50%) plus $(CH_3)_2Si(OCH_3)_2$ (35△) plus $CH_2=CHSi(OC_2H_5)_2$ (10%) $CH_3$ plus $C_6H_{11}Si(OC_2H_5)_3$ (5%) | Copolymer containing: $CF_3SCH_2Si(CH_3)O$—, $(CH_3)_2SiO$—, $CH_2=CHSiO$— $CH_3$ and $C_6H_{11}SiO_{1.5}$ units |

TABLE F—Continued

| Example | Silane | Siloxane produced |
|---|---|---|
| 5h | $CF_3SCH_2Si(CH_3)_2Cl$ (80%) plus $Si(OC_2H_5)_4$ (20%) | $[CF_3SCH_2Si(CH_3)_2O]_4Si$ |
| 5i | $CF_3SCH_2Si(OC_2H_5)_3$ (25%) plus $(CH_3)_3SiCl$ (75%) | $CF_3SCH_2Si[OSi(CH_3)_3]_3$ |
| 5j | $CF_3SCH(C_6H_5)Si(CH_3)Cl_2$ |  |
| 5k | $CF_3SCH(CH_2Cl)SiCl_3$ | $CF_3SCH(CH_2Cl)SiO_{1.5}$ |

EXAMPLE 6

Using procedures described in Example 1, a solution of 23 g. (0.15 mole) of hexamethyldisiloxane and 7.8 g. (0.06 mole) of perfluoromethylsulfenyl chloride was photolyzed to yield 1.3 g. of pentamethyl(perfluoromethylthiomethyl)disiloxane, $$CF_3SCH_2Si(CH_3)_2OSi(CH_3)_3,$$

b.p. 105–107° C. at 140 mm. The fluorine nuclear magnetic resonance spectrum exhibits a peak for the $$CF_3SCH_2{-}$$

group at about 45.1φ (CFCl₃ as internal reference).

EXAMPLE 7

Using the procedures described in Example 1, a solution of 1.8 g. of polydimethylsiloxane gum (Dow Corning DC–400), 25 ml. of methylene chloride and 4 g. (0.03 mole) of perfluoromethylsulfenyl chloride was photolyzed for two hours. The mixture was then allowed to evaporate in a tray to remove solvent and the residue heated at 50° in vacuo for 15 hours giving 3.1 g. of a clear elastomeric poly(perfluoromethylthiomethylsiloxane) gum having the following analyses: Percent C, 22.6; Percent F, 25.1; Percent Cl, 2.8. The elastomer exhibits a glass transition (T_g) of about —90° C. and contains

 and $(CH_3)_2SiO-$ units.

EXAMPLE 8

Using procedures described in Example 7, a solution of 1.8 g. of polydimethylsiloxane gum DC–400, 8.0 g. (0.06 mole) of perfluoromethylsulfenyl chloride and 30 ml. of methylene chloride was photolyzed giving 4.5 g. of poly(perfluoromethylthiomethylsiloxane) gum having 31.7% F. The elastomer (T_g, —75°) dissolved slowly in acetone. A 1.0 g. sample was shaken at room temperature with 10 ml. of toluene for 40 hours, giving 0.9 g. insoluble polymer. The starting gum under similar treatment exhibited complete solubility in toluene after four hours shaking.

EXAMPLE 9

A larger scale reaction was carried out using 30 g. of polydimethylsiloxane gum (DC–400), 116 g. (0.85 mole) perfluoromethylsulfenyl chloride and 400 ml. of methylene chloride in a vertical 1-liter quartz reactor. The sulfenyl chloride was charged in three portions to the polymer solution and after each addition the yellow solution was photolyzed at ambient temperature until the solution became colorless. Photolysis was carried out using a 450 watt Hanovia Lamp, No. L–679 A, and the total time of photolysis was four hours. There was obtained 68.8 g. of poly(perfluoromethylthiomethylsiloxane) gum containing about 25% F. A sample of the elastomer was heated in vacuo at 260–340° C. for one hour and then 340–345° C. (650° F.) for one hour resulting in a 10% weight loss. The residue was a crosslinked siloxane essentially insoluble in acetone, toluene or methylene chloride.

EXAMPLE 10

Using the procedure described in Example 9, 40 g. of low shrinkage polydimethylsiloxane gum (Union Carbide W–980), 110 g. (0.8 mole) of perfluoromethylsulfenyl chloride and methylene chloride (500 ml.) was photolyzed in a quartz tube giving 77 g. of colorless, transparent poly(perfluoromethylthiomethylsiloxane) gum having 26.0% fluorine and 3.1% chlorine which was essentially insoluble in benzene but soluble in methyl ethyl ketone.

The above procedure was repeated using a sodium borosilicate glass reactor instead of quartz giving an elastomeric gum having 25.7% fluorine. A sample of the polymer (25.3% F) was heated in the presence of air at a rate of 10°/min. At 800° the weight loss was about 70%. Under similar conditions a sample of commercially available

gum stock was heated and a 98% weight loss at about 500° was observed.

EXAMPLE 11

Using procedures described in Example 9, a solution of 18.0 g. of polydimethylsiloxane fluid (Dow Corning DC–200) having a viscosity of about 500 centistokes at 25° C., 51.7 g. (0.38 mole) of perfluoromethylsulfenyl chloride and 150 ml. of methylene chloride was photolyzed until the solution became colorless. After removal of solvent and heating the residue at 80° C. in vacuo there was obtained 41.5 g. of a viscous polyperfluoromethylthiomethylsiloxane) fluid having about 25% fluorine. The fluid was colorless, soluble in chloroform and exhibited a viscosity of about 6000 centistokes at 25° C.

The fluid (3.0 g.) was dissolved in methylene chloride and two microliters of 1,1,3,3-tetramethylguanidine added. The methylene chloride was evaporated and the viscous residue heated in air at 100° C. for one hour giving a tack-free siloxane which was essentially insoluble and exhibited low swell in benzene and heptane. Very similar results were obtained using triethylamine or 1,4-diazabicyclo[2.2.2]octane as catalysts.

EXAMPLE 12

Using procedures described in Example 7, a solution of 2.5 g. of a polydimethylsiloxane gum containing $-Si(CH_3)(C_6H_5)O-$ units (Union Carbide W–970), 6.0 g. of perfluoromethylsulfenyl chloride and 30 ml. of methylene chloride was photolyzed to yield 4.8 g. poly-(perfluoromethylthiomethylsiloxane) elastic gum having $-Si(CH_2SCF_3)(CH_3)O-$, $-Si(CH_3)(C_6H_5)O-$ and a minor amount of $-Si(CH_2SCF_3)(C_6H_5)O-$ units. The gum contains about 20% fluorine.

EXAMPLE 13

Using procedures described in Example 7, a solution of 1.9 g. of polydimethylsiloxane gum (Union Carbide W–980), 5.7 g. (0.013 mole) of perfluoroheptylsulfenyl chloride and 30 ml. of methylene chloride was photolyzed for about 1.5 hours. The product which precipitated from solution was washed with methylene chloride and the insoluble polymer heated at 60° C. in vacuo to afford 4.0 g. of poly(perfluoroheptylthiomethylsiloxane) gum having $C_7F_{15}SCH_2-$ groups attached to silicon atoms. The gum, having 32% F, exhibits very low solubility and swell in benzene and acetone.

EXAMPLE 14

Using procedures described in Example 13, a solution of 10 g. of omega-hydroperfluorooctylsulfenyl chloride, 2.8 g. of polydimethylsiloxane gum and 35 ml. of methylene chloride was photolyzed until colorless. Evaporation of the solvent and heating the polymer at 150° *in vacuo* in a sublimator gave 5.8 g. of omega-hydroperfluorooctylthiomethyl siloxane residue having 36.1% F. The siloxane contains

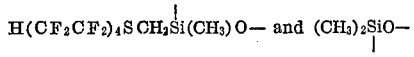

$H(CF_2CF_2)_4SCH_2\overset{|}{Si}(CH_3)O-$ and $(CH_3)_2\overset{|}{Si}O-$ units.

EXAMPLE 15

A solution of 2.5 g. of polydimethylsiloxane gum (W-980), 50 ml. of benzene and 0.1 g. of azobisisobutyronitrile catalyst was heated to 60° C. and 6.8 g. of perfluoromethylsulfenyl chloride added to the stirred solution over a period of 30 min. The resultant mixture was stirred at 60° C. for 18 hours. From the mixture was isolated 3.9 g. of poly(perfluoromethylthiomethylsiloxane) elastomeric gum containing about 10% fluorine.

Very similar results were obtained using benzoyl peroxide as catalyst at 80° C.

EXAMPLE 16

An essentially homogeneous mixture of 2.0 g. poly-(perfluoromethylthiomethylsiloxane) gum prepared in Example 7 containing 29.9% fluorine, 0.4 g. of fumed silica, 0.1 g. ferric oxide and 0.02 g. of zinc oxide was pressed under about 10 pounds pressure at 130° C. for 45 minutes and then post cured at 150° C. for 15 hours giving a rubber having low swell in toluene and acetone.

EXAMPLE 17

To a solution of 15 g. of the vinyl siloxane,

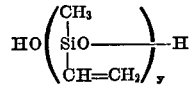

where *y* is about 30, in 100 ml. of methylene chloride was added 30 g. of perfluoromethylsulfenyl chloride until the solution became colorless. The solvent was allowed to evaporate and the residue heated *in vacuo* at 50°. The fluid product is believed to contain the units

$CF_3SCH(CH_2Cl)\overset{|}{Si}(CH_3)O-$.

It was found to contain 19.7% C, 16.2% Cl and 21.2% F.

| Example | $R_f$ | Y | n | R |
|---|---|---|---|---|
| 1, 3, 7, 8, 9, 10, 11, 15. | $CF_3$ | H | 1 | $CH_3$ |
| 1 | $CF_3$ | Cl, H and $CF_3S$ | 1 | $CH_3$ |
| 5a | $CF_3$ | H | 1 | $C_6H_5$ (phenyl) |
| 5c | $CF_3$ | $CF_3CH_2$ | 1 | $CH_3$ |
| 5b | $C_4F_9$ | H | 1 | $CH_3$ |
| 5d | $CF_3$ | $CH_3$ | 2 | $C_2H_5$ |
| 5e, f | $CF_3$ | H | 0 | |
| 5h | $CF_3$ | H | 2 | $CH_3$ |
| 5j | $CF_3$ | $C_6H_5$ (phenyl) | 1 | $CH_3$ |
| 12 | $\{CF_3$ | H | 1 | $CH_3$* |
|  | $CF_3$ | H | 1 | $C_6H_5$* |
| 13 | $C_7F_{15}$ | H | 1 | $CH_3$ |
| 14 | $H(CF_2CF_2)_8$ | H | 1 | $CH_3$ |
| 17 | $CF_3$ | $CH_2Cl$ | 1 | $CH_3$ |

*Copolymer.

The above table is merely a convenient listing of the different groups specifically exemplified in the working examples of this invention. The listed generic groups which may appear on the polymer units of this invention and which include these species are discussed elsewhere herein. Those compounds encompassed by the generic disclosure and not shown by specific examples may be produced by the general methods and techniques disclosed herein.

I claim:

1. An organosiloxane containing at least one unit of the formula

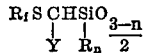

wherein $R_f$ is a highly fluorinated monovalent fluoroaliphatic radical having 1 to 18 carbon atoms, R is an organic radical selected from methyl, ethyl, and phenyl groups, Y is selected from methyl, chloromethyl, phenyl, $R_fS$, $R_fCH_2$, chlorine and hydrogen, and

*n* is 0–2, the remaining groups in the organosiloxane being siloxy groups containing only methyl, ethyl, or phenyl groups bonded to silicon.

2. The organosiloxane of claim 1 wherein $R_f$ is perfluoroalkyl.

3. The organosiloxane of claim 1 wherein Y is hydrogen.

4. The organosiloxane of claim 1 wherein R is methyl and *n* is 1–2.

5. The organosiloxane of claim 1 wherein $R_f$ is perfluoroalkyl, Y is hydrogen, R is methyl.

6. The organosiloxane of claim 1 having a molecular weight of at least 300,000.

7. The organosiloxane of claim 3 where R is methyl.

8. An organosiloxane consisting essentially of units of the formula

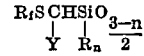

wherein $R_f$ is a highly fluorinated monovalent fluoroaliphatic radical having 1 to 18 carbon atoms, R is an organic radical selected from methyl, ethyl, and phenyl groups, Y is selected from methyl, chloromethyl, phenyl, $R_fS$, $R_fCH_2$, chlorine and hydrogen, and

*n* is 0.2.

9. The organosiloxane of Claim 1 wherein the highly fluorinated monovalent fluoroaliphatic radical is saturated, with no more than one atom, selected from trivalent nitrogen or divalent oxygen bonded only to carbon atoms, for every two carbon atoms in the fluoroaliphatic radical, and no more than one of either hydrogen or chlorine atoms substituted for fluorine on the fluoroaliphatic chain of each carbon atom.

10. The organosiloxane of Claim 8 wherein the highly fluorinated monovalent fluoroaliphatic radical is saturated, with no more than one atom, selected from trivalent nitrogen or divalent oxygen bonded only to carbon atoms, for every two carbon atoms in the fluoroaliphatic radical, and no more than one of either hydrogen or chlorine atoms substituted for fluorine on the fluoroaliphatic chain of each carbon atom.

11. A method for preparing fluoroaliphaticthiomethylsiloxanes which comprises reacting a highly fluoriatned aliphatic sulfenyl chloride of the formula

wherein $R_f$ is a highly fluorinated monovalent radical having 1 to 18 carbon atoms, with a methylsiloxane of the formula

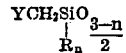

wherein

R is an organic radical selected from methyl, ethyl, and phenyl groups,

Y is selected from methyl, chloromethyl, phenyl, $R_fS$, $R_fCH_2$, chlorine and hydrogen, and
$n$ is 0–2.

12. The method of claim 11 wherein the reaction is carried out in the presence of a free radical catalyst.

13. The method of claim 11 wherein $R_f$ is perfluoroalkyl.

14. The method of claim 11 wherein Y is hydrogen.

15. The method of claim 11 wherein R is methyl and $n$ is 1–2.

16. The method of claim 11 wherein R is methyl, Y is hydrogen, $R_f$ is perfluoroalkyl and $n$ is 1–2.

17. The method of claim 11 wherein the reaction is carried out at atmospheric pressure.

18. The process of Claim 11 wherein the highly fluorinated monovalent radical is saturated, with no more than one atom, selected from trivalent nitrogen or divalent oxygen bonded only to carbon atoms, for every two carbon atoms in the fluoroaliphatic radical.

References Cited
UNITED STATES PATENTS

| | | | |
|---|---|---|---|
| 3,255,140 | 6/1966 | Sinn et al. | 260—448.2 N X |
| 3,478,076 | 11/1969 | Kim et al. | 260—448.2 N |

PATRICK P. GARVIN, Primary Examiner

P. F. SHAVER, Assistant Examiner

U.S. Cl. X.R.

252—49.6, 351, 357; 260—37 SB, 46.5 E, 46.5 G, 448.2 E